(12) United States Patent
Ouyang et al.

(10) Patent No.: US 9,239,510 B2
(45) Date of Patent: Jan. 19, 2016

(54) TUNABLE OPTICAL FREQUENCY CONVERTER BASED ON A DOPPLER VIBRATION MIRROR

(71) Applicant: SHENZHEN UNIVERSITY, Shenzhen, Guangdong (CN)

(72) Inventors: Zhengbiao Ouyang, Guangdong (CN); Chunchao Qi, Guangdong (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 32 days.

(21) Appl. No.: 14/360,443

(22) PCT Filed: Oct. 24, 2012

(86) PCT No.: PCT/CN2012/083443
§ 371 (c)(1),
(2) Date: May 23, 2014

(87) PCT Pub. No.: WO2013/075565
PCT Pub. Date: May 30, 2013

(65) Prior Publication Data
US 2014/0327956 A1    Nov. 6, 2014

(30) Foreign Application Priority Data
Nov. 23, 2011    (CN) .......................... 2011 1 0378752

(51) Int. Cl.
*G02F 1/35* (2006.01)
*G02F 2/02* (2006.01)
(52) U.S. Cl.
CPC    *G02F 1/353* (2013.01); *G02F 2/02* (2013.01); *G02F 2203/56* (2013.01)

(58) Field of Classification Search
CPC ........................................................ G02F 1/353
USPC ............................... 359/326–332; 372/21–22
See application file for complete search history.

(56) References Cited

U.S. PATENT DOCUMENTS 5,101,291 A * 3/1992 Jopson ............................ 398/79
5,734,493 A * 3/1998 Jopson .......................... 359/326
(Continued)

FOREIGN PATENT DOCUMENTS

| CN | 1554967 | 12/2004 |
| CN | 101695200 | 4/2010 |

(Continued)

*Primary Examiner* — Daniel Petkovsek
(74) *Attorney, Agent, or Firm* — Hmre, Schumann, Mueller & Larson, P.C.

(57) ABSTRACT

The present invention provides a tunable optical frequency converter based on a Doppler vibration mirror, which comprises a laser, a first optical isolator, a circulating frequency shift module. Said circulating frequency shift module is composed of an optical coupler, a Doppler vibration mirror, a plane mirror, a first optical circulator, an optical fiber Bragg grating, an optical amplifier, a second optical circulator, a tunable filter and a first optical isolator. Light outputted by said laser is inputted to said circulating frequency shift module to conduct frequency shifting repeatedly after passing through the first optical isolator, and then separated by a tunable filter and a second optical circulator, then the frequency converted light is outputted from the port of the circulating frequency shift module. The frequency converter provided in the present invention has a compact volume and fewer optical components, which means it is easy to be integrated, a big frequency converting range, a high frequency converting efficiency and a high output power.

13 Claims, 1 Drawing Sheet

(56) References Cited

U.S. PATENT DOCUMENTS

| | | |
|---|---|---|
| 6,723,991 B1 | 4/2004 | Sucha et al. |
| 2014/0300948 A1* | 10/2014 | Ouyang et al. ............. 359/326 |
| 2014/0313570 A1* | 10/2014 | Ouyang et al. ............. 359/326 |
| 2014/0320953 A1* | 10/2014 | Ouyang et al. ............. 359/326 |

FOREIGN PATENT DOCUMENTS

| | | |
|---|---|---|
| CN | 102244335 | 11/2011 |
| CN | 102540624 | 7/2012 |
| JP | 2000-039635 | 2/2000 |

* cited by examiner

TUNABLE OPTICAL FREQUENCY CONVERTER BASED ON A DOPPLER VIBRATION MIRROR

FIELD OF THE INVENTION

The present invention relates to a tunable optical frequency converter based on the Doppler vibration mirror, particularly to a frequency converter capable of broadband tuning based on a Doppler vibration mirror frequency-shift, circulating frequency shift and filtering technology.

BACKGROUND OF THE INVENTION

Optical frequency down-conversion and up-conversion are essentially the difference-frequency and the sum-frequency technologies. Compared with the traditional method by harmonic generation, the biggest advantage of the difference-frequency and sum-frequency synthesis technology systems is that the systems are portable and compact, and contains richer frequency components. Currently, this technology includes frequency spacing dichotomy, optical parametric oscillator method, nonlinear crystal optical method, laser diode four-wave mixing frequency method, optical frequency comb generator method, and so on. The frequency spacing dichotomy method and the optical frequency comb generator method are more characteristic in these methods. Both methods aim at dividing a large spacing of optical frequencies into a plurality of smaller frequency spacing in a certain relationship with a known frequency which generally can be measured by known means, thus an extremely convenient means is provided for the frequency detection technology.

From another perspective, if we can continue to move the measurable frequencies with small pitch and eventually get arbitrarily frequencies with large spacing, and these arbitrary optical frequencies can also be measured, it would be a very good idea. For example, a known frequency $\omega_{rf}$ is known in advance, now in the vicinity of the original frequency $\omega_c$, via only implementations of known frequency $\omega_{rf}$ multiplication or demultiplication several times, finally, any desired frequency $\omega_c \pm n\omega_{rf}$ can be achieved via the original frequency $\omega_c$. And at this time, the magnitude of each frequency can be shown up through a filter like a frequency "screen". If this idea can really be realized, not only the technology can meet the requirements of the optical frequency measurement, but also any desired frequency of the light source can be obtained.

To realize this idea, the present invention discloses a tunable optical frequency converter based on a Doppler vibration mirror. The invention will greatly simplify the structure of the frequency-tunable laser, significantly reduce the cost, miniaturize the prior large optical laboratory, since one such tunable optical frequency converter can replace dozens to hundreds of lasers, thus the integrated cost of the optical experiments can be substantially reduced, expected to be widely used in scientific research, industrial production and so on.

SUMMARY OF THE INVENTION

Technical problem to be solved by the present invention is to provide a compact, portable broadband frequency tuning converter which is easy to integrate and can be broadbandly and high-effectively tuned.

The solution to solve the technical problem of the present invention is that: a tunable optical frequency converter based on a Doppler vibration mirror is provided; the converter includes a laser, a first optical isolator, a circulating frequency shift module; light outputted by said laser is inputted to said circulating frequency shift module to conduct frequency shifting repeatedly after passing through the first optical isolator, and then separated by a tunable filter and a second optical circulator, then frequency converted light is outputted from the port of the circulating frequency shift module.

The laser is a semiconductor laser, a gas laser, a solid laser or a fiber laser with an operating wavelength in the 100 nm-100000 nm band.

The optimum value of the closed-loop gain coefficient of the tunable circulating frequency shift module based on the Doppler vibration mirror is 1, the second optimum value is positive integer other than 1, and the third optimum value is the reciprocal value of the positive integer other than 1.

Said circulating frequency shift module is composed of an optical coupler, a Doppler vibration mirror, a plane mirror, a first optical circulator, an optical fiber Bragg grating, an optical amplifier, a second optical circulator, a tunable filter and a second optical isolator.

Said Doppler vibration mirror is a total-reflection Doppler vibration mirror, and is used for frequency modulation. The mechanical vibration of the Doppler vibration mirror is driven by an electromagnet or a Piezoelectric ceramic or a high frequency vibration motor.

The output power of the fiber Bragg grating can't exceed the maximum allowable input light power of the optical amplifier.

Said first light circulator is a 3-port circulator, wherein, a first port is connected to the output port of the a plane mirror, a second port is connected to the input port of the optical fiber Bragg grating, and a third port is connected to an absorbing load which absorbs the reflected light from the optical fiber Bragg grating.

Said second light circulator is a 3-port circulator, wherein, a first port thereof is connected to the output port of the optical amplifier, a second port is connected to the input port of the tunable filter, and a third port serves as the light output port of the circulating frequency shift module.

The operating frequency bandwidth of respective members in the tunable circulating frequency shift module based on the Doppler vibration mirror is not less than the frequency difference between the maximum output frequency at the output end of the circulation module and the frequency of the laser source.

The operating wavelength bands of said first optical isolator and respective members in the tunable circulating frequency shift module based on the Doppler vibration mirror are consistent with that of the laser.

Said tunable filter is a narrow-band filter which reflects a narrow-band light desired to be filtered to the third port of the second circulator so as to output it, and transmits the light with other frequencies to the input port of the second optical isolator, the frequency variation of said frequency converter is equal to the difference between the frequency of the narrow-band output light of the tunable filter and that of the output light of the laser, and the tunable frequency range of the frequency converter is not more than that of the narrow-band output light of the tunable filter.

The tunable filter is a frequency-tunable filter manufactured by one-dimensional defect-photonic-crystal technology or optical-diffraction-grating technology.

The photonic bandgap of the one-dimensional photonic crystal is not less than the frequency tuning range of the final output light wave of the system, said one-dimensional photonic crystal includes a refractive index adjustable defect layer, the refractive index adjusting method of which includes electro-induced refractive index change, magneto-induced refractive index change, acoustic-induced refractive index change, photo-induced refractive index change, force-induced refractive index change or thermal-induced refractive index change, the one-dimensional photonic crystal has a defect mode which changes along with the change of the refractive index of the defect layer, thus the tunable filtering function is realized. The fiber Bragg grating can acquire the tunable filtering function by selecting different diffraction orders.

The tunable optical frequency converter provided in the present invention has small size, fewer optical members, low cost, large tuning range, high tuning efficiency, high output power, and easy operation, and is easy to be integrated.

BRIEF DESCRIPTION OF THE DRAWINGS

Below in connection with the accompanying drawings and specific embodiments, the present invention will be described in further detail.

DETAILED DESCRIPTION OF THE PREFERRED EMBODIMENTS

Figure 1:
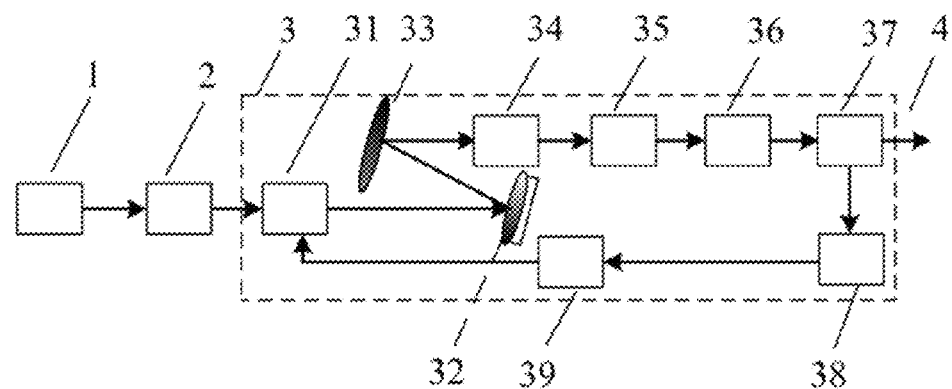
FIG. 1 is a system structure schematic diagram of the tunable optical frequency converter based on the Doppler vibration mirror in the present invention.

The present invention provides a tunable optical frequency converter based on the Doppler vibration mirror, as shown in FIG. 1, which includes a laser 1, a first optical isolator 2, and a circulating frequency shift module 3 based on the Doppler vibration mirror. Light outputted by said laser 1 is inputted to said circulating frequency shift module 3 to conduct frequency shifting repeatedly after passing through the first optical isolator 2, and then separated by a tunable filter 38 and a second optical circulator 37, then frequency converted light is outputted from the port 4 of the circulating frequency shift module.

The laser 1 is a semiconductor laser, a gas laser, a solid laser or a fiber laser with an operating wavelength in the 100 nm-100000 nm band.

The optimum value of the closed-loop gain coefficient of the tunable circulating frequency shift module 3 based on the Doppler vibration mirror is 1, the second optimum value is positive integer other than 1, and the third optimum value is the reciprocal value of the positive integer other than 1.

The circulating frequency shift module 3 is composed of an optical coupler 31, a Doppler vibration mirror 32, a plane mirror 33, a first optical circulator 34, an optical fiber Bragg grating 35, an optical amplifier 36, a second optical circulator 37, a tunable filter 38 and a second optical isolator 39.

Said Doppler vibration mirror 32 is a total-reflection Doppler vibration mirror which induces the reflective wave to be conducted Doppler frequency shift, and is used for frequency modulation. The mechanical vibration of the Doppler vibration mirror is driven by an electromagnet or a Piezoelectric ceramic or a high frequency vibration motor.

The principle of the frequency converter based on the Doppler vibration mirror frequency-shift is that: the electromagnetic wave emitted by said laser 1 is injected to the Doppler vibration mirror 32 after passing through the optical coupler 31, and when the movement direction of the vibration mirror and the transmission direction of the electromagnetic are opposite, the frequency increases, otherwise the frequency reduces; each after circulation once, the output frequency is changed by $\Delta\omega$ based on the injected signal light frequency $\omega_{c0}$, after repeating the frequency shift N times, the tunable filter 38 outputs the light wave with a frequency of $\omega_{c0} \pm N\Delta\omega$, and transmits the light with other frequency to the input end of the second optical isolator 39 and conducts further frequency shift via the optical coupler 31.

Assuming the light wave signal outputted by the laser 1 propagates along z-direction, the input signal is also called a carrier signal, then, the electric vector of the carrier signal is $$E_c = E_{c0} \exp[i(\omega_{c0} t - k_c z + \phi_{c0})] \tag{1}$$

wherein, $E_{c0}$ is the amplitude of the carrier signal, $\omega_{c0}$ is the circular frequency of the carrier signal, t is time, $k_c$ is the wave vector of the carrier signal, $\phi_{c0}$ is the initial phase of the carrier signal; when the Doppler vibration mirror 32 vibrates, that is equivalent to the space phase of the carrier signal is modulated, assuming the relationship between the displacement of the vibration mirror and the circular frequency of the vibration mirror accords with a sine relationship, i.e., $$z_D = \delta_D \sin(\Omega_D t) \tag{2}$$

wherein, $\delta_D$ is the amplitude of the modulation signal of the vibration mirror, and $\Omega_D$ is the vibration circular frequency of the vibration mirror. Then, after the frequency is modulated once by the Doppler vibration mirror 32, the electric vector of the light wave output from the plane mirror 33 is:

$$E = E_{c0} \exp\{i[\omega_{c0} t + \phi_{c0} - k_c \delta_D \sin(\Omega_D t)]\} \tag{3}$$

wherein, $k_c \delta_D$ is the modulation rate, generally, $\omega_{c0} t \gg k_c \delta_D$. The formula (3) is rewritten as following form:

$$E = E_{c0} \exp\{i[\int_0^t [\omega_{c0} - \Delta\omega(t)] dt + \phi_{c0}]\},$$

$$\Delta\omega(t) = \Omega_D k_c \delta_D \cos(\Omega_D t) \tag{4}$$

It can be seen from formula (4), after the carrier wave passes through the Doppler vibration mirror once, the maximum frequency shift thereof is $\Omega_D k_c \delta_D$.

In the circulating frequency shift module based on the Doppler vibration mirror, after the light wave is conducted circulating frequency shift N times, the maximum frequency shift amount of $N\Omega_D k_c \delta_D$ is acquired. So long as the frequency shift amount doesn't cause the light frequency to arrive at the selected frequency of the tunable filter, the light wave would be fed back to the circulating frequency shift module without stopping until the frequency shift amount has caused the light frequency to arrive at the selected frequency of the tunable filter.

Said first light circulator 34 is a 3-port circulator, wherein, a first port is connected to the output port of the a plane mirror 33, a second port is connected to the input port of the optical fiber Bragg grating 35, and a third port is connected to an absorbing load which absorbs the reflected light from the optical fiber Bragg grating 35.

Said second light circulator 37 is a 3-port circulator, wherein, a first port thereof is connected to the output port of the optical amplifier 36, a second port is connected to the input port of the tunable filter 38, and a third port serves as the light output port of the circulating frequency shift module 3.

The operating frequency bandwidth of respective members in the tunable circulating frequency shift module 3 based on the Doppler vibration mirror is not less than the frequency difference between the maximum output frequency at the output end of the circulation module and the frequency of the laser source. The operating wavelength bands of said first optical isolator 2 and respective members in the tunable circulating frequency shift module 3 based on the Doppler vibration mirror are consistent with that of the laser 1. The output power of the fiber Bragg grating 35 can't exceed the maximum allowable input light power of the optical amplifier 36.

Said tunable filter 38 is a narrow-band filter which reflects a narrow-band light desired to be filtered to the third port of the second circulator 37 so as to output it, and transmits the light with other frequencies to the input port of the second optical isolator 39, the frequency variation of said frequency converter is equal to the difference between the frequency of the narrow-band output light of the tunable filter 38 and that of the output light of the laser 1, and the tunable frequency range of the frequency converter is not more than that of the narrow-band output light of the tunable filter 38.

Figure 2:
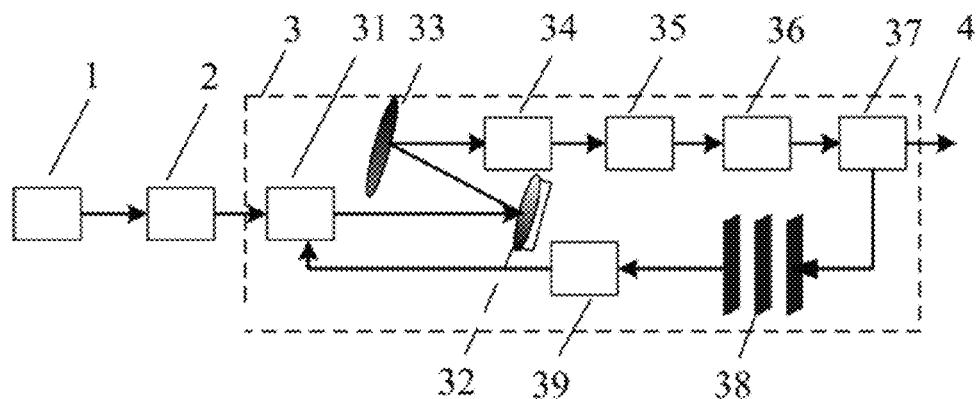
FIG. 2 is a schematic diagram of the first embodiment of the tunable optical frequency converter based on the Doppler vibration mirror in the present invention.
Figure 3:
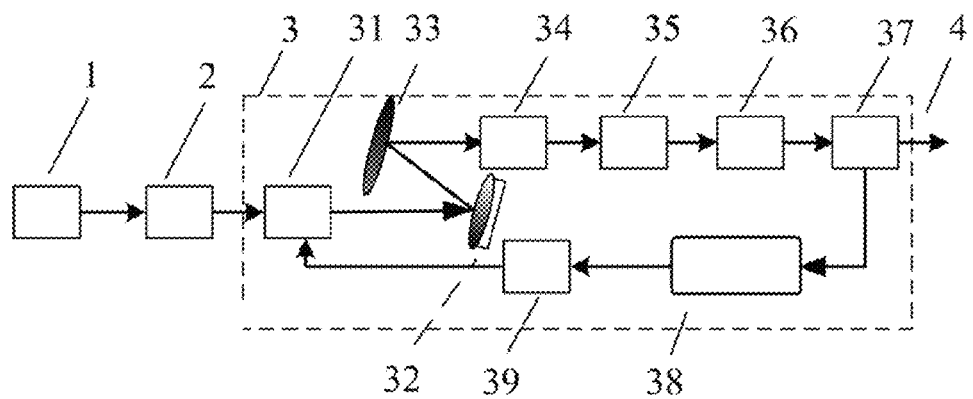
FIG. 3 is a schematic diagram of the second embodiment of the tunable optical frequency converter based on the Doppler vibration mirror in the present invention.

Preferably, the tunable filter 38 is a Bragg grating manufactured by the diffraction-grating technology (as shown in FIG. 2) or a tunable filter manufactured by one-dimensional defect-photonic-crystal technology (as shown in FIG. 3). The photonic bandgap of the one-dimensional photonic crystal is not less than the frequency tuning range of the final output light wave of the system, said one-dimensional photonic crystal includes a refractive index adjustable defect layer, the refractive index adjusting methods of which include electro-induced refractive index change, magneto-induced refractive index change, acoustic-induced refractive index change, photo-induced refractive index change, force-induced refractive index change or thermal-induced refractive index change. The one-dimensional photonic crystal has a defect mode which changes along with the change of the refractive index of the defect layer, thus the tunable filtering function is realized. The fiber Bragg grating can acquire the tunable filtering function by selecting different diffraction orders.

Respective component part and the operating parameters thereof in one embodiment are described as follows. The laser 1 is selected to be a semiconductor CW laser with a ultra-narrow band width in 1550 nm, which has an operating wavelength of 1550 nm at 25, an output power of 5 mW, a continuous operating mode, a maximum band width of 50 kHz, and the output fiber type of which is SMF-28 single mode fiber (9/125 µm). The Doppler vibration mirror 32 with total reflection ability can be driven by an electromagnet or a piezoelectric ceramic or directly by a high frequency vibration motor, and has a small volume. The tunable filter 38 is selected to have a tuning width up to 40 nm, for the central wavelength almost covering the entire C-band (1528 nm~1610 nm), the insertion loss of which is 4.0 dB, the volume of the filter is 24×8.8×35 $cm^3$. The optical amplifier 36 is selected to have an operating bandwidth of 40 nm, covering the entire C-band. The optical coupler 31 is selected to be the 50/50 optical element in response to the wavelength of 1550 nm. The first optical circulator 34 and the second optical circulator 37 are selected to have a responding wavelength around 1550 nm and a bandwidth of 40 nm, wherein, the first optical circulator 34 is an optical device connected to the absorbing load and provides an optical isolation effect, while the reflected light is absorbed by the absorbing load, then the device provides not only an optical isolation but also an environmental protection effects; while the second optical circulator 37 functions as both participating in the light circulation and light output. The fiber Bragg grating 35 is selected to provide a reflection inhibition effect for the carrier wavelength of 1550 nm. The optical coupler 31 optically couples the output light of the laser 1 source together with the light circulated back as modulation signal light of the Doppler vibration mirror 32, the frequency of the signal light is changed by Doppler Effect, and the frequency of the signal light is shifted. When the frequency of the signal light reaches the selected frequency of the tunable filter 38, the tunable filter reflects the light with the selected frequency back to the third output port 4 of the second optical circulator 37 and outputs it, otherwise the signal light will be transmitted with a high transmittance to the input port of the second optical isolator 39, and then enter the optical coupler 31 to be fed back to the Doppler vibration mirror 32 again to perform the frequency shift. This frequency shift process is continuously repeated, so that ultimately, the frequency shift of any magnitude is acquired, which is one of the key advantages of the scheme.

Relative to the prior frequency inverter, the present invention has the following outstanding advantages:

(1) Low Price.

Compared to the present expensive frequency converting technology described by the optical parametric oscillator method, optical frequency comb method, or mode-locked laser method, neither the expensive laser source nor the precious nonlinear optical crystal is used in the present invention, so that the cost is greatly reduced.

(2) Compact, Portable.

The whole tunable frequency converter based on the Doppler vibration mirror is assembled by using the commercially available ordinary light sources and optical fiber components, and the final volume is estimated not to exceed 40×10×35 $cm^3$, weighing no more than 8 kg.

(3) Simple Light Path.

In the apparatus, as all the connections employ optical fibers, and none of the optical element is a movable optical element, the rest parts are easy to be fixed. The device is easy to be optically integrated.

(4) Big Tuning Range or Tuning Width.

Theoretically, the scheme can realize arbitrary frequency output, so long as the bandwidths of tunable filters, optical isolators, optical amplifiers, optical circulators, optical couplers and transmission fibers are infinitely developed, our scheme will always apply. Even for the current optical components, such as tunable filters, optical amplifiers and so on, with an operating bandwidth of only 40 nm, the frequency tuning width of 5 THz is acquired. In short, with the increase of the tuning bandwidths of all the optical components, such as the tunable filter, the optical circulator, and the band-pass amplifier, the range of the frequency shift will increase proportionally.

(5) High Tuning Efficiency.

Tuning frequency of the scheme can be achieved in three ways: on the one hand, the operating frequency of the Doppler vibration mirror is fixed and only the filter frequency of the tunable filter is changed, the frequency changing ability is achieved; on the other hand, the filter frequency of the tunable filter may be fixed, while the operating frequency of the Doppler vibration mirror is continuously changed; the third way, both are regulated. Ultimate change of the frequency can be acquired by any kind of tuning, and the regulation efficiency thereof is very high.

(6) High Output Power.

Since the maximum gain of the tunable circulating frequency shift module based on the Doppler vibration mirror can reach 1, so long as the output power of the initial laser source is set, after the circulating frequency shift is conducted, an output power which is absolutely equal to the initial setting of the laser source can be obtained, at the same time, the desired frequency is also obtained.

Although the present patent has described a number of specific examples, this patent without departing from the spirit of the claims specified, all changes to the person skilled in the art are evident.

What is claimed is:

1. A tunable optical frequency converter based on a Doppler vibration mirror, wherein the tunable optical frequency converter comprising:
   a laser;
   a first optical isolator;
   a circulating frequency shift module, the circulating frequency shift module essentially consists of:
   an optical coupler, a Doppler vibration mirror, a plane mirror, a first optical circulator, an optical fiber Bragg grating, an optical amplifier, a second optical circulator, a tunable filter and a second optical isolator; the second optical circulator is a 3-port circulator, wherein a first port thereof is connected to the output port of the optical amplifier, a second port is connected to the input port of the tunable filter, and a third port serves as the light output port of the circulating frequency shift module,
   light output by the laser is input to the circulating frequency shift module to conduct frequency shifting repeatedly after passing through the first optical isolator, and separated by a tunable filter and a second optical circulator, frequency converted light is output from a port of the circulating frequency shift module.

2. The tunable optical frequency converter according to claim 1, wherein the laser is a semiconductor laser, a gas laser, a solid laser or a fiber laser with an operating wavelength in the 100 nm-100000 nm band.

3. The tunable optical frequency converter according to claim 1, wherein a value of the closed-loop gain coefficient of the tunable circulating frequency shift module is 1.

4. The tunable optical frequency converter according to claim 1, wherein the Doppler vibration mirror is a total-reflection Doppler vibration mirror, and is used for frequency modulation; the mechanical vibration of the Doppler vibration mirror is driven by an electromagnet, a Piezoelectric ceramic or a high frequency vibration motor.

5. The tunable optical frequency converter according to claim 1, wherein the output power of the fiber Bragg grating is equal to or less than the maximum input light power of the optical amplifier.

6. The tunable optical frequency converter according to claim 1, wherein the aid first optical circulator is a 3-port circulator, wherein, a first port is connected to the output port of the a plane mirror, a second port is connected to the input port of the optical fiber Bragg grating, and a third port is connected to an absorbing load which absorbs the reflected light from the optical fiber Bragg grating.

7. The tunable optical frequency converter according to claim 1, wherein the operating frequency bandwidth of respective members in the tunable circulating frequency shift module based on the Doppler vibration mirror is not less than the frequency difference between the maximum output frequency of the output end of the circulation module and the frequency of the laser.

8. The tunable optical frequency converter according to claim 1, wherein the operating wavelength bands of the first optical isolator and respective members in the tunable circulating frequency shift module are consistent with that of the laser.

9. The tunable optical frequency converter according to claim 1, wherein the tunable filter is a narrow-band filter which reflects a narrow-band light desired to be filtered to the third port of the second optical circulator so as to output it, and transmits the light with other frequencies to the input port of the second optical isolator, the frequency variation of the frequency converter is equal to the difference between the frequency of the narrow-band output light of the tunable filter and that of the output light of the laser, and the tunable frequency range of the frequency converter is not more than that of the narrow-band output light of the tunable filter.

10. The tunable optical frequency converter according to claim 9, wherein the tunable filter is a frequency-tunable filter manufactured by one-dimensional defect-photonic-crystal technology or optical-diffraction-grating technology.

11. The tunable optical frequency converter according to claim 10, wherein the photonic bandgap of the one-dimensional photonic crystal is not less than the frequency tuning range of the final output light wave of the tunable optical frequency converter system, the one-dimensional photonic crystal includes a refractive index adjustable defect layer, the refractive index adjusting method of which includes electro-induced refractive index change, magneto-induced refractive index change, acoustic-induced refractive index change, photo-induced refractive index change, force-induced refractive index change or thermal-induced refractive index change, the one-dimensional photonic crystal has a defect mode which changes along the refractive index of the defect layer, thus the tunable filtering function is realized the fiber Bragg grating can acquire the tunable filtering function by selecting different diffraction orders.

12. The tunable optical frequency converter according to claim 1, wherein a closed-loop gain coefficient of the tunable circulating frequency shift module is a positive integer other than 1.

13. The tunable optical frequency converter according to claim 1, wherein a closed-loop gain coefficient of the tunable circulating frequency shift module is a reciprocal value of a positive integer other than 1.

* * * * *